Nov. 29, 1960     H. W. WINKLER ET AL     2,962,062
ATTACHMENT FOR POWER SAWS

Filed Dec. 8, 1958     2 Sheets-Sheet 1

HOWARD W. WINKLER
CARL L. GREENWELL
    INVENTORS

BY *Robert C. Comstock*

ATTORNEY

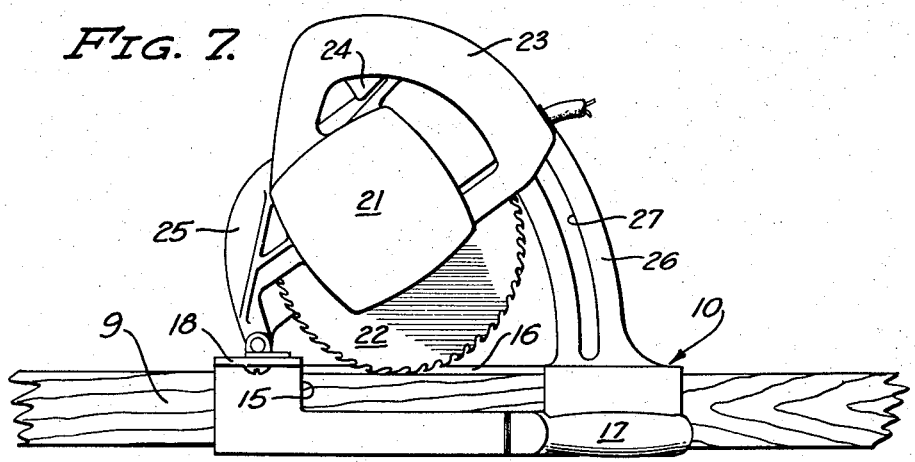
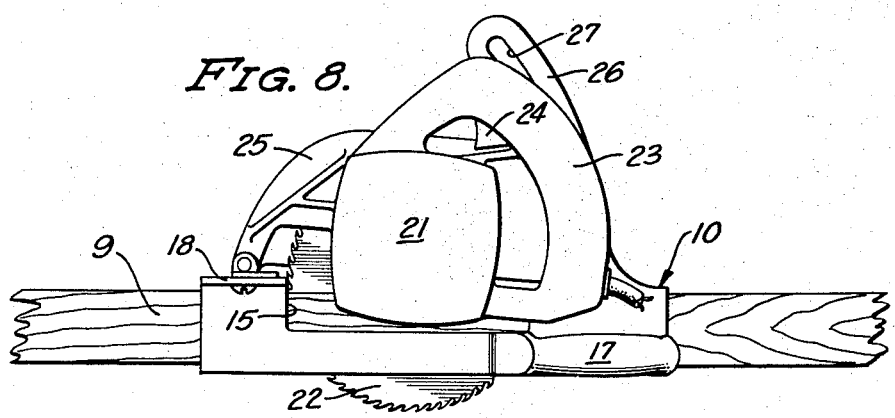
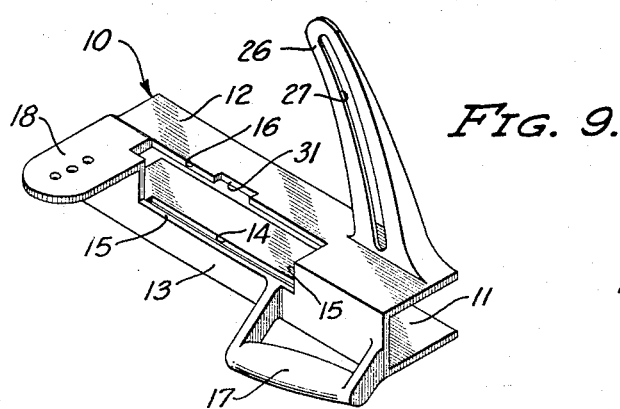

United States Patent Office 2,962,062
Patented Nov. 29, 1960

2,962,062
ATTACHMENT FOR POWER SAWS

Howard W. Winkler, 607 S. Fircroft, West Covina, Calif., and Carl L. Greenwell, 3121 Oakwood Ave., Lynwood, Calif.

Filed Dec. 8, 1958, Ser. No. 778,752

6 Claims. (Cl. 143—43)

This invention relates to an attachment for power saws which facilitates the cutting of studs for let-in bracing and similar operations in the carpentry and construction field.

At the present time, it is customary for some carpenters to cut three or four kerfs with a power saw and then knock out the weakened portion in order to form a notch for receiving the brace. Others use a chisel to form the notch, which is even slower.

It is an object of our invention to provide an attachment for power saws whereby cutting of the notches is performed quickly and easily. With the use of our attachment, the carpenter needs no tools other than the power saw. The use of our invention saves a considerable amount of time over methods and procedures now in use, as well as improving the accuracy, neatness and workmanship.

It is a further object of our invention to provide such an attachment which can also be used for let-in ribbons for balloon framing, for cutting plaster grounds, and for other carpentry and construction operations.

It is an object of our invention to provide an attachment which is adapted to fit substantially any type of conventional power saw with little or no alteration.

In essence, our invention contemplates an attachment for a power saw which comprises a substantially U-shaped channel which is adapted to fit around three sides of a standard two-by-four piece of lumber. The mounting bracket of the power saw is attached to the channel so that the saw is mounted for pivotal movement with respect to the channel. Placement of the channel around a two-by-four assures a clean cut of the proper angle and depth for the bottom of the notch. The same saw can be used to make the end cuts to complete the notch.

It is accordingly an object of our invention to provide an attachment for power saws having all of the advantages and benefits of the structure set forth above. It is particularly an object of our invention to provide such a device which will make the cutting of stud notches simpler and faster than heretofore.

It is a related object of our invention to provide a device of the class described which is simple and economical to construct and which is simple and fast to operate.

Our invention also comprises such other objects, advantages and capabilities as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings, Fig. 1 is a top plan view of our attachment secured to a power saw;

Fig. 7 is a top plan view of our attachment in use at the beginning of the cutting operation for cutting the bottom of the slot;

Fig. 8 is a top plan view of our attachment in use at the end of the same cutting operation;

Fig. 9 is a perspective view of our attachment per se.

Figure 1:
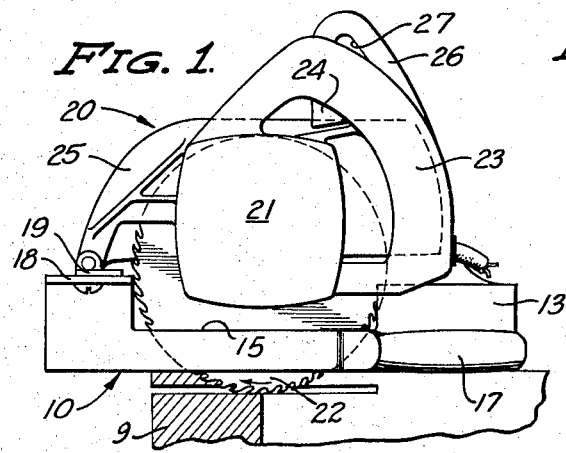
Figure 2:
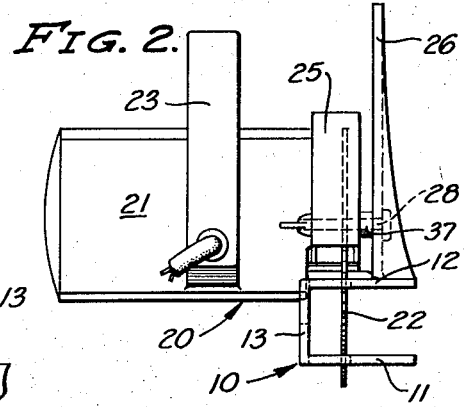
Fig. 2 is an end view of the same.
Figure 3:
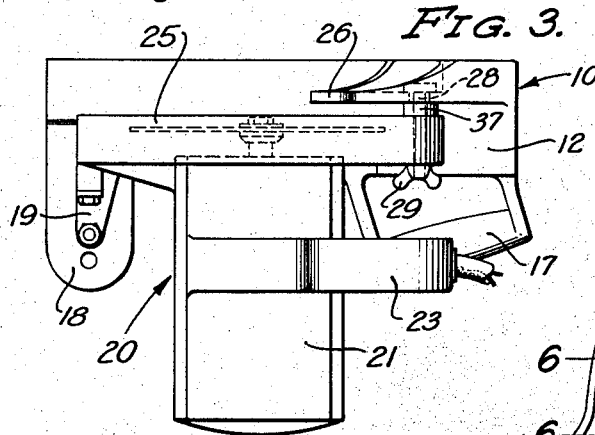
Fig. 3 is a side elevational view of the same.

A preferred embodiment which has been selected to illustrate our invention comprises a substantially U-shaped channel 10, which is adapted to fit closely around three sides of a conventional two-by-four piece of lumber 9. The channel 10 includes two parallel sides 11 and 12 and a top 13. The side 11 has an opening 14 which extends longitudinally adjacent the inner section of the side 11 and top 13. The top 13 is provided with an opening 15 adjacent the inner section of the top 13 and side 12. The side 12 has an opening 16 which merges with the opening 15.

One end of the channel 10 is provided with a handle 17, which extends upwardly from the top 13. The other end of the channel 10 is provided with an arm 18, which extends along the side 12 and upwardly beyond the top 13. Secured to the arm 18 is the mounting bracket 19 of a power saw 20. The power saw 20 is pivotally mounted with respect to the bracket 19, such mounting being part of the construction of the saw 20.

The power saw 20 is conventional in its structure and operation. It includes an electrically operated motor 21 which drives a rotating blade 22. A handle 23 is secured to the motor and includes a trigger 24 for controlling operation of the motor 21. A shield 25 encloses the upper portion of the blade 22 in order to protect the user from possible injury.

The end of the side 12 of the channel 10 which is remote from the arm 18 is provided with a guide plate 26, which extends at an angle beneath the power saw 20. The guide plate 26 is provided with an elongated arcuate opening 27. A pin 28 extends through the shield 25 of the power saw 20 and through the opening 27 in the guide plate 26. A wing nut 29 is screw threadedly mounted on the end of the pin 28 adjacent the shield 25. The other end of the pin 28 carries an enlargement 30. A roller 36 is rotatably mounted on the portion of the pin 28 which extends through the opening 27. An enlarged spacer 37 is disposed between the guide plate 26 and the shield 25.

The arcuate opening 27 has a radius corresponding to the pivotal movement of the power saw 20 with respect to the mounting bracket 19. The roller 36 moves along the opening 27 and the enlargement 30 and spacer 37 prevent lateral movement of the power saw 20 in order to assure movement of the blade 22 in a straight line.

In use, the channel 10 is quickly and easily positioned around a two-by-four 9 which is one of the studs of a building wall. The notches for the bracing are customarily cut before the two-by-four studs are erected and while they are in a horizontal position. When the channel 10 is in its proper position (Figure 7), the blade 22 of the power saw 20 is disposed at a right angle with respect to one side of the two-by-four 9. The blade 22 is spaced downwardly a short distance from the top 13 of the channel 10, such distance corresponding to the proper depth for the notch to be cut.

The trigger 24 is then depressed to start the motor 21 and rotate the blade 22. The power saw 20 is pivoted toward the two-by-four 9 so that the blade 22 cuts completely through the two-by-four 9, from one side to the other (Figure 8).

Figure 4:
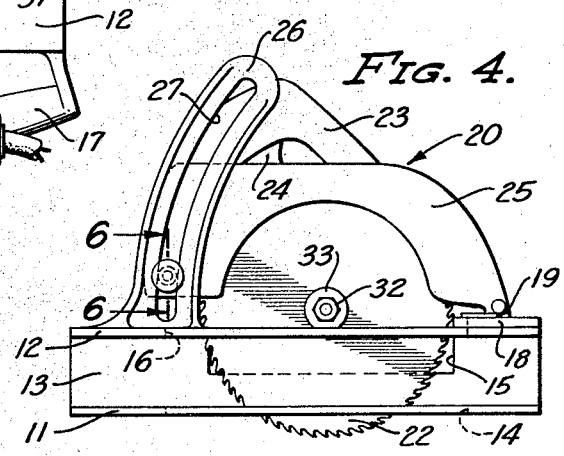
Fig. 4 is a bottom plan view of the same.
Figure 5:
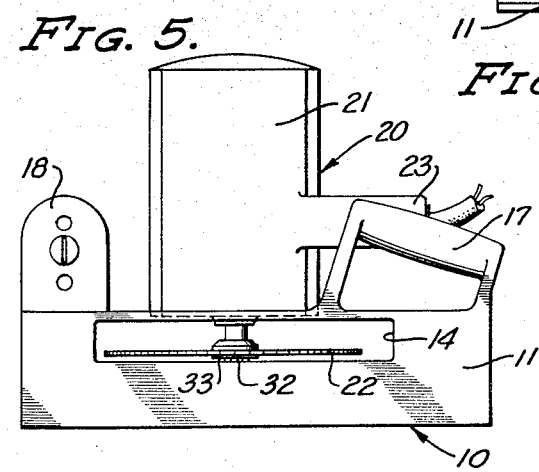
Fig. 5 is a side elevational view of the same taken from the side opposite from Fig. 3.
Figure 6:
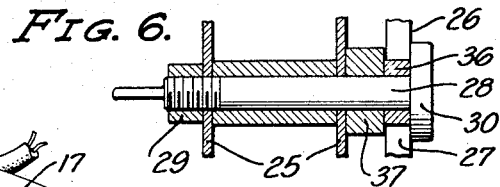
Fig. 6 is an enlarged sectional view taken on line 6—6 of Fig. 4.

The blade 22 moves through the opening 16 in the side 12 as it engages the side of the two-by-four 9. The blade 22 then moves through the two-by-four and through the opening 14 in the opposite side 11. The opening 15 in the top 13 receives the motor 21 as the blade 22 reaches the end of its cutting movement. The opening 16 in the side 12 is provided with a notch 31 (Figure 9) adjacent its midportion which is adapted to receive a nut 32 and washer 33 (Figures 4 and 5) which rotatably mount the blade 22 and which are part of the conventional structure of the power saw 20.

Upon completion of this cutting operation, the blade 22 has cut through the two-by-four 9 along a line parallel to the top thereof. The cut thus formed comprises the bottom of the notch. The power saw 20 is then pivoted away from the two-by-four 9 until the blade 22 is free. The channel 10 is then removed from around the two-by-four 9.

The saw 20 can then be used to make the end cuts to complete the notch. This is accomplished by positioning the channel 10 so that the side 11 rests upon the top of the two-by-four 9 adjacent one end of the cut previously made. If the notch being cut is for conventional diagonal bracing, the blade 22 is disposed diagonally with respect to the two-by-four. The blade 22 is then moved downwardly to make a cut normal to the one previously made. The blade 22 is then raised and moved to the opposite end of the first cut to make the other end cut.

The intersection of the three cuts thus made frees a block of wood, the removal of which provides a notch for receiving the bracing.

The sequence of forming the cuts described is by way of example only and may be varied as desired by the user.

It will be noted that with our invention it is possible for a user to perform all of the necessary cutting operations with a single tool. The fixed pivotal mounting of the saw with respect to the channel assures an evenly cut notch of exactly the proper depth. The use of our device enables an operator to cut the necessary notches in much less time than has previously been possible, while also assuring complete accuracy and neatness.

The embodiment of our invention shown in the drawings and described herein is designed for a common type of conventional power saw now in use. Our attachment can also be adapted for use with other makes and types of power saws without change or with slight modifications which are well within the skill of the art.

We claim:

1. In combination with a motor operated saw, an attachment comprising a substantially U-shaped channel having a pair of oppositely disposed parallel sides and a top joining said sides, said channel being adapted to fit around three sides of a rectangular piece of lumber, a handle carried by said channel and disposed upwardly from the top thereof, said saw being pivotally connected on a transverse axis to one side of said channel at one end of said channel, said saw having a blade, said blade extending parallel to and spaced downwardly from the top of said channel, a guide plate adjacent the end of said channel remote from the pivotal connection of said saw, said guide plate extending in a plane substantially parallel to said blade, said guide plate having an arcuate opening formed therein, the radius of said opening corresponding to the pivotal movement of the adjacent portion of said saw, a pin secured to said saw and extending through said arcuate opening for movement therealong as said saw is pivoted with respect to said channel, the sides of said channel having aligned openings therein for permitting the movement of said blade through said openings and through a piece of lumber disposed therebetween upon the pivotal movement of said saw with respect to said channel, the top of said channel having an opening therein adjacent said saw adapted to receive the motor of said saw, said saw being pivotable between two positions, in one of which said pin is disposed adjacent the upper end of said arcuate opening and said blade is free from engagement with a piece of lumber disposed within said channel, and in the other of which said pin is disposed adjacent the lower end of said arcuate opening and said blade extends completely through said piece of lumber.

2. The structure described in claim 1, said blade protruding a substantial distance beyond said channel when said pin is disposed adjacent the lower end of said arcuate opening, said channel adapted to rest upon a piece of lumber for making a second cut in a direction normal to that made when said channel surrounds said piece of lumber.

3. In combination with a motor operated saw, an attachment comprising a substantially U-shaped channel having a pair of oppositely disposed parallel sides and a top joining said sides, said channel being adapted to fit around three sides of a rectangular piece of lumber, said saw being pivotally connected on a transverse axis to one side of said channel at one end of said channel, said saw having a blade, said blade extending parallel to and spaced downwardly from the top of said channel, a guide plate adjacent the end of said channel remote from the pivotal connection of said saw, said guide plate extending in a plane substantially parallel to said blade, said guide plate having an arcuate opening formed therein, the radius of said opening corresponding to the pivotal movement of the adjacent portion of said saw, a pin secured to said saw and extending through said arcuate opening for movement therealong as said saw is pivoted with respect to said channel, the sides of said channel having aligned openings therein for permitting the movement of said blade through said openings and through a piece of lumber disposed therebetween upon the pivotal movement of said saw with respect to said channel, said saw being pivotable between two positions, in one of which said pin is disposed adjacent the upper end of said arcuate opening and said blade is free from engagement with a piece of lumber disposed within said channel, and in the other of which said pin is disposed adjacent the lower end of said arcuate opening and said blade extends completely through said piece of lumber.

4. In combination with a motor operated saw, an attachment comprising a substantially U-shaped channel having a pair of oppositely disposed parallel sides and a top joining said sides, said channel being adapted to fit around three sides of a rectangular piece of lumber, said saw being pivotally connected on a transverse axis to one side of said channel at one end of said channel, said saw having a blade, said blade extending parallel to and spaced downwardly from the top of saidd channel, a guide plate adjacent the end of said channel remote from the pivotal connection of said saw, said guide plate extending in a plane substantially parallel to said blade, means carried by said saw cooperative with said guide plate to guide said blade in a direction substantially parallel to the top of said channel upon the pivotal movement of said saw with respect to said channel, the sides of said channel having aligned openings therein for permitting the movement of said blade through said openings and through a piece of lumber disposed therebetween upon the pivotal movement of said saw with respect to said channel.

5. In combination with a motor operated saw, an attachment comprising a substantially U-shaped channel having a pair of oppositely disposed parallel sides and a top joining said sides, said channel being adapted to fit around three sides of a rectangular piece of lumber, said saw being pivotally connected on a transverse axis to said channel at one end of said channel, said saw having a blade, said blade extending parallel to and spaced downwardly from the top of said channel, the sides of said channel having aligned openings therein for permitting the movement of said blade through said openings and through a piece of lumber disposed therebetween upon the pivotal movement of said saw with respect to said channel.

6. In combination with a motor operated saw, an attachment comprising a channel having a top and at least one side extending at substantially a right angle to said top, said channel being adapted to fit around at least two sides of a rectangular piece of lumber, said saw being pivotally connected on a transverse axis to said channel at one end of said channel, said saw having a blade, said blade extending parallel to and spaced downwardly from the top of said channel, and means for permitting movement of said saw blade through said side and through a piece of lumber disposed within said channel upon the pivotal movement of said saw with respect to said channel.

References Cited in the file of this patent

UNITED STATES PATENTS

| | | |
|---|---|---|
| 1,170,454 | Magerkurth | Feb. 1, 1916 |
| 2,623,557 | Kendall | Dec. 30, 1952 |
| 2,705,513 | Moeller | Apr. 5, 1955 |
| 2,771,104 | Saxe | Nov. 20, 1956 |